(12) United States Patent
Feng et al.

(10) Patent No.: US 12,285,821 B2
(45) Date of Patent: Apr. 29, 2025

(54) METHOD FOR THE LASER MACHINING OF A WORKPIECE

(71) Applicant: TRUMPF (China) Co., Ltd., Taicang (CN)

(72) Inventors: Feng Feng, Taicang (CN); Franz Lehleuter, Shanghai (CN); Yuan Liu, Taicang (CN); Ke You Chen, Taicang (CN); Yi Fei, Taicang (CN)

(73) Assignee: TRUMPF (CHINA) CO., LTD., Taicang (CN)

( * ) Notice: Subject to any disclaimer, the term of this patent is extended or adjusted under 35 U.S.C. 154(b) by 0 days.

(21) Appl. No.: 18/957,944

(22) Filed: Nov. 25, 2024

(65) Prior Publication Data

US 2025/0083260 A1    Mar. 13, 2025

Related U.S. Application Data

(63) Continuation of application No. PCT/CN2022/095208, filed on May 26, 2022.

(51) Int. Cl.
*B23K 26/53* (2014.01)
*B23K 26/08* (2014.01)

(52) U.S. Cl.
CPC .......... *B23K 26/53* (2015.10); *B23K 26/0869* (2013.01)

(58) Field of Classification Search
CPC .... B23K 26/53; B23K 26/0869; B23K 26/00; B23K 37/0408; B23K 26/354; B23K 26/70; B23K 26/0643; B23K 26/0066; B23K 26/127; B23K 26/352

USPC .............. 219/121.82, 121.6, 121.65, 121.66, 219/121.75, 121.77, 121.78, 121.86, 219/121.85

See application file for complete search history.

(56) References Cited

U.S. PATENT DOCUMENTS

| | | |
|---|---|---|
| 10,620,444 B2 | 4/2020 | Kumkar et al. |
| 11,883,903 B2 | 1/2024 | Mishchik et al. |
| 12,110,247 B2 | 10/2024 | Sohr et al. |

(Continued)

FOREIGN PATENT DOCUMENTS

| | | |
|---|---|---|
| DE | 102014116958 B4 | 6/2017 |
| DE | 102019128362 B3 | 2/2021 |

(Continued)

*Primary Examiner* — Phuong T Nguyen
(74) *Attorney, Agent, or Firm* — LEYDIG, VOIT & MAYER, LTD.

(57) ABSTRACT

A method for the laser machining of a workpiece by using a machining beam is provided. Material modifications are formed in the material along a predetermined machining line by action of the machining beam upon the material. A first group of spaced-apart material modifications is formed in the material, with adjacent material modifications of the first group being formed one after the other in time and having a distance $d_0$ from one another of at least $0.25*\lambda$ and/or at most $2.5*\lambda$. A second group of spaced-apart material modifications is formed in the material, with mutually material modifications of the second group being formed one after the other in time and having a distance $d_0$ from one another of at least $0.25*\lambda$ and/or at most $2.5*\lambda$. The shortest distance $d_1$ between the material modifications of the first group and the material modifications of the second group being at least 5 μm.

20 Claims, 2 Drawing Sheets

(56) References Cited

U.S. PATENT DOCUMENTS

| | | | |
|---|---|---|---|
| 2002/0086245 A1* | 7/2002 | Zait | B23K 26/0624 |
| | | | 430/945 |
| 2014/0004639 A1 | 1/2014 | Sato | |
| 2022/0234135 A1 | 7/2022 | Flamm et al. | |

FOREIGN PATENT DOCUMENTS

| | | |
|---|---|---|
| DE | 102019218995 A1 | 6/2021 |
| EP | 3597353 A1 | 1/2020 |
| EP | 3487656 B1 | 8/2021 |
| EP | 3872041 A1 | 9/2021 |
| EP | 3227241 B1 | 1/2022 |
| WO | WO 2016079062 A1 | 5/2016 |

* cited by examiner

METHOD FOR THE LASER MACHINING OF A WORKPIECE

CROSS REFERENCE TO RELATED APPLICATIONS

This application is a continuation of International Application No. PCT/CN2022/095208 (WO 2023/225935 A1), filed on May 26, 2022. The aforementioned application is hereby incorporated by reference herein.

FIELD

Embodiments of the present invention relate to a method for the laser machining of a workpiece by means of a machining beam, the workpiece comprising a material that is transparent to a wavelength $\lambda$ of the machining beam.

BACKGROUND

DE 10 2014 116 958 B4 discloses an optical system for the shaping of a laser beam for machining a material that is largely transparent to the laser beam, the laser beam being focused by means of the system into an elongated focal zone which is oriented parallel to the propagation direction of the laser beam.

DE 10 2019 128 362 B3 discloses a diffractive optical beam shaping element for imposing a phase distribution on a transverse beam profile of a laser beam, it being possible to use the beam shaping element to form a Bessel-like beam having an asymmetrical and in particular elliptical cross section.

DE 10 2019 218 995 A1 discloses a method for the modification by a laser beam of a material that is at least largely transparent to the laser beam, a focal zone of a single pulse of the laser beam that is drawn out in the beam propagation direction being made to interact with the material and the interaction of the single pulse with the material creating a channel that passes through the material from a first end face to a second end face and has a channel width dimension of at most 1 μm.

EP 3 597 353 A1 discloses a method for separating a transparent material by means of an elongated focal zone of a laser beam.

EP 3 227 241 B1 discloses a method for separating a transparent material by means of multiple parallel nondiffractive laser beams.

EP 3 872 041 A1 discloses a method for separating a glass element at least in certain regions into at least two glass sub-elements along an impingement surface, a line focus being used to form a tension zone within the glass element, with initial damage being introduced into the glass material in the tension zone for the purpose of forming at least one crack and the crack being advanced in the tension zone in order to form the separating surface and separate the glass element.

EP 3 487 656 B1 discloses a method for separating a dielectric material or semiconductor material, a laser beam being focused in two spatially spaced-apart focal zones and the spaced-apart focal zones being applied to the material, with the result that a microfracture extending between the focal zones is formed in the material.

SUMMARY

Embodiments of the present invention provide a method for the laser machining of a workpiece by using a machining beam. Material modifications are formed in the material along a predetermined machining line by action of the machining beam upon the material. A first group of spaced-apart material modifications is formed in the material, with adjacent material modifications of the first group being formed one after the other in time and having a distance do from one another of at least $0.25*\lambda$ and/or at most $2.5*\lambda$. A second group of spaced-apart material modifications is formed in the material, with mutually material modifications of the second group being formed one after the other in time and having a distance $d_0$ from one another of at least $0.25*\lambda$ and/or at most $2.5*\lambda$. The shortest distance $d_1$ between the material modifications of the first group and the material modifications of the second group being at least 5 μm.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
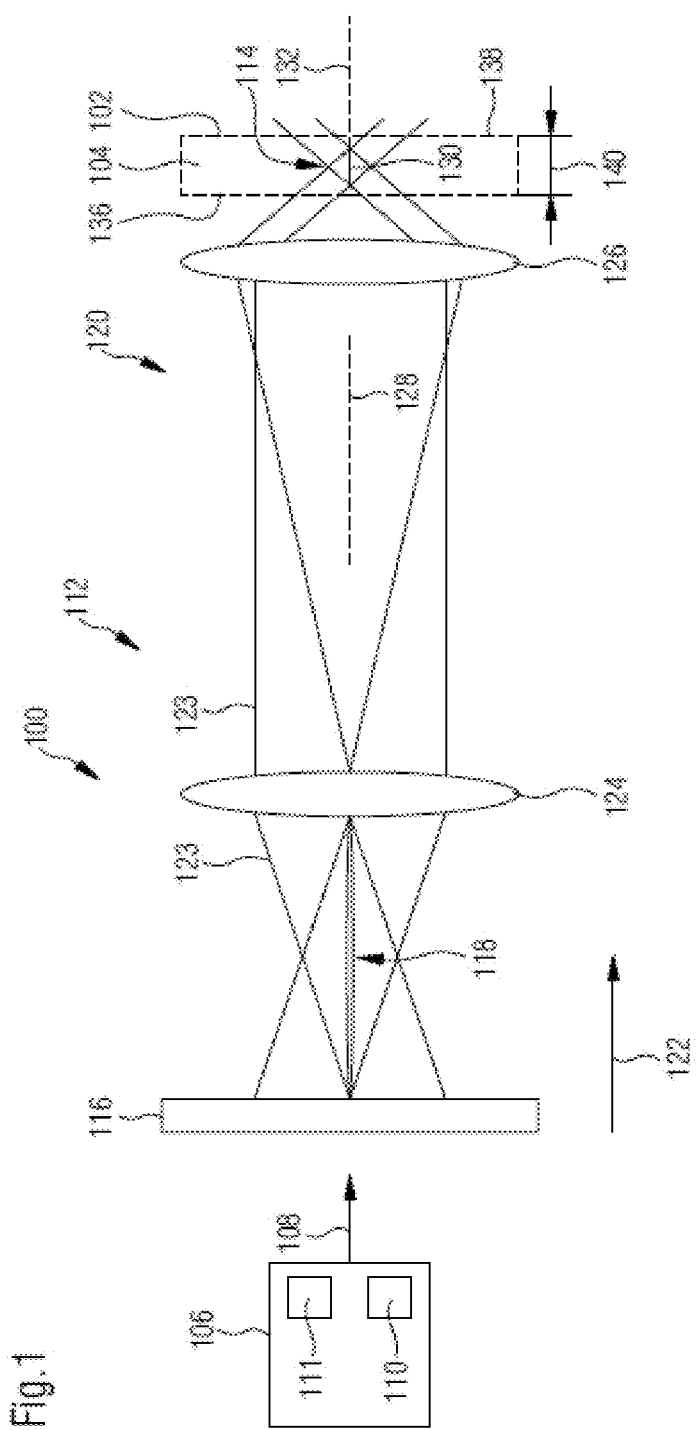
FIG. 1 shows a schematic illustration of an exemplary embodiment of an apparatus for the laser machining of a workpiece.

Embodiments of the present invention provide a method, which makes it possible for the material to be modified in a way associated with the formation of cracks, a preferred direction of the cracks being oriented substantially parallel to a predetermined machining line.

According to some embodiments, material modifications are formed in the material along a predetermined machining line by action of the machining beam upon the material, in that a first group of spaced-apart material modifications is formed in the material, with mutually adjacent material modifications of the first group being formed one after the other in time and having a distance from one another of at least $0.25*\lambda$ and/or at most $2.5*\lambda$, and in that a second group of spaced-apart material modifications is formed in the material, with mutually adjacent material modifications of the second group being formed one after the other in time and having a distance from one another of at least $0.25*\lambda$ and/or at most $2.5*\lambda$, and the shortest distance between the material modifications of the first group and the material modifications of the second group being at least 5 μm.

Transparent materials can be separated, for example, in that laser machining of the material is used to form material modifications in the material which mechanically weaken it along a predetermined machining line. The material modifications comprise mechanical cracks, which are arranged in the region of the machining line in the material and make it possible for the material to be separated there. For example, the cracks form "predetermined breaking points", at which the mechanical separation of the material is made possible.

The machining line thus defines a separating line and/or separating surface that is created when the material is separated. For a high separation quality, it is essential that the cracks formed run as parallel as possible to the machining line and/or as parallel as possible to a direction of the distance between adjacent material modifications that are formed. This makes it possible to realize a separating surface that is as smooth as possible. In addition, possible damage to a separated workpiece segment (unit segment), which can result from the uncontrolled formation of cracks, for example, can be reduced.

By means of the method according to some embodiments, it is possible to form material modifications in the material which are associated with the formation of cracks or result in the formation of cracks, it being possible to control a preferred direction of the cracks. It has been shown that forming spaced-apart material modifications having the aforementioned distance range one after another in time causes cracks to be formed in the material which extend at least approximately parallel to the machining line and/or to a direction of the distance between the adjacent material modifications.

Setting up a minimal distance of 5 μm between the material modifications of mutually adjacent groups is beneficial for the strength of the glass edge after cutting.

In particular, when carrying out the method according to some embodiments, cracks are formed, and/or carrying out the method causes cracks to form, each of which extends at least in certain portions between the material modifications of a specific group and/or each of which extends at least in certain portions between the material modifications of adjacent closest groups, such as between the first group and the second group, for example. A preferred direction and/or main direction of extent of the cracks that are formed is oriented at least approximately parallel to the machining line.

In particular, it can be provided that the machining beam is a pulsed laser beam and preferably an ultrashort pulse laser beam. For example, in that case a respective laser pulse or pulse train composed of a plurality of laser pulses, which is also referred to as "burst", for example, is introduced into the material for the purpose of forming a specific material modification by means of the machining beam.

For example, the machining beam comprises laser pulses with a pulse duration of at least 0.3 ps and/or at most 20 ps.

For example, the machining beam comprises laser pulses with a pulse energy of at least 50 μJ and/or at most 500 μJ. It can be provided that, for the purpose of forming a specific material modification, individual laser pulses and in particular a single laser pulse with this pulse energy are introduced into the material by means of the machining beam, or that, for the purpose of forming a specific material modification, a pulse train composed of multiple laser pulses is introduced, a total energy of the pulse train being at least 50 μJ and/or at most 500 μJ. A pulse train may comprise, for example, 2 to 20 sub-pulses at a time interval of approximately 20 ns.

For example, the machining beam comprises laser pulses with a repetition rate of at least 100 kHz and/or at most 300 kHz and preferably approx. 200 kHz.

It can be favorable if at least one further group of spaced-apart material modifications is formed, with mutually adjacent material modifications of the at least one further group being formed one after the other in time and having a distance from one another of at least 0.25*λ and/or at most 2.5*λ, and the shortest distance between the material modifications of the at least one further group and material modifications of a group of material modifications that is adjacent and closest to the at least one further group being at least 5 μm. In particular, a multiplicity of further groups of material modifications may be provided, each of the further groups being arranged along the machining line. This makes it possible in particular to increase an overall length of extent of cracks formed in the material as desired. This allows the formation of cracks in the material along a machining line with a variable length.

The indication "mutually adjacent material modifications" or "mutually adjacent groups" is to be understood in the present case to mean material modifications or groups, respectively, that are adjacent and closest to one another (also referred to as nearest neighbors), between which in particular no further material modifications or groups, respectively, are arranged.

It can be advantageous if the distance between the adjacent material modifications assigned to a specific group is in each case at least 0.5*λ and/or at most 2.0*λ and preferably at least 0.7*λ and/or at most 1.5*λ and preferably at least 0.85*λ and/or at most 1.25*λ. For example, the distance is approx. 1.0*λ. This makes it possible to optimally control an alignment of the cracks that are formed in order to align them at least approximately parallel to the machining line and/or the direction of the distance between adjacent material modifications.

A "specific group" is to be understood as meaning, for example, the first group, the second group or the at least one further group.

For example, a specific group of material modifications may have two or more adjacent and/or spaced-apart material modifications. The respective groups preferably have two material modifications or consist of two material modifications, for example a first material modification and a second material modification that is spaced apart from the first material modification.

In particular, it can be provided that the wavelength λ of the machining beam is at least 300 nm and/or at most 1500 nm and preferably at least 1000 nm and/or at most 1100 nm. For example, the wavelength is approx. 1030 nm.

A material that is transparent to the wavelength is to be understood to mean in particular a material through which at least 70% and in particular at least 80% and in particular at least 90% of the laser energy of a laser beam that is incident on this material and has this wavelength is transmitted.

It can be favorable if the material modifications are formed one after another in time along the machining line by means of the machining beam. In particular, the material modifications assigned to a specific group are formed one after another in time by means of the machining beam. In particular, this makes it possible to form cracks in the region of the material modifications, the cracks running at least in certain portions between the material modifications and being oriented at least approximately parallel to the machining line.

It can be advantageous if the mutually adjacent material modifications assigned to a specific group are formed at a time interval of at least 1 μs and/or at most 15 μs and preferably at least 2 μs and/or at most 8 μs and preferably at least 3.5 μs and/or at most 6.5 μs. For example, the time interval is approx. 5 μs. This makes it possible to optimally control an alignment of the cracks that are formed in order to align them at least approximately parallel to the machining line and/or to the direction of the distance between adjacent material modifications.

In the case of a pulsed laser beam, the aforementioned time intervals correspond in particular to those time intervals at which the respective laser pulses or pulse trains composed of multiple laser pulses are introduced into the material by means of the machining beam in order to form the mutually adjacent material modifications.

It can be favorable if the shortest distance between the material modifications of adjacent closest groups of material modifications is at least 7 μm and/or at most 40 μm and preferably at least 8.5 μm and/or at most 30 μm and preferably at least 10 μm and/or at most 20 μm. For example, the distance is approx. 15 μm. This makes it possible to optimally control an alignment of the cracks that are formed in order to align them at least approximately parallel to the machining line and/or the direction of the distance between adjacent groups.

It can be advantageous if the machining beam is moved relative to the material along the machining line at an advancement speed and in particular at a constant advancement speed, the advancement speed being at least 50 mm/s and/or at most 400 mm/s and preferably at least 100 mm/s and/or at most 300 mm/s and preferably at least 150 mm/s and/or at most 250 mm/s. For example, the advancement speed is approx. 200 mm/s. In conjunction with typical beam parameters of the machining beam, this makes it possible to form the material modifications with the aforementioned time intervals and spatial distances easily from a technical standpoint.

It can be favorable if the machining beam has the same beam parameters for the purpose of forming the material modifications assigned to a specific group. In particular, it can be provided that the machining beam has the same beam parameters for the purpose of forming all of the material modifications along the machining line. As a result, in particular, no complex control and/or regulation of the beam parameters or synchronization of the beam parameters with specific positions of the machining beam on the machining line is necessary. This makes it possible to carry out the method easily from a technical standpoint.

In particular, in the case of a pulsed machining beam, it can be provided that the laser pulses for forming the adjacent material modifications have the same pulse energies.

In that case, in particular, a first pulse forming a first material modification does not form any crack, but it modifies the material and generates stress inside the material, which reduces the threshold of crack formation in the adjacent region. Then, a second pulse forming a second modification might form a crack due to the lower threshold.

In an alternative variant, it is in principle also possible for the machining beam to have different beam parameters for the purpose of forming mutually adjacent material modifications that are assigned to a specific group.

For example, in the case of a pulsed machining beam, it can be provided that the laser pulses for forming the adjacent material modifications have different pulse energies.

In particular, a first pulse energy of a laser pulse or pulse train for forming a first material modification of a specific group is lower than a second pulse energy of a laser pulse or pulse train for forming a second material modification, adjacent to the first material modification, of this group. In particular, the first pulse energy is at least 40% and/or at most 95% of the second pulse energy, preferably at least 50% and/or at most 70% and preferably at least 55% and/or at most 65% of the second pulse energy.

The pulse energy of a pulse train is understood to mean in particular the respective pulse energy of the laser pulses making up the pulse train.

To form the mutually adjacent laser pulses, laser pulses or pulse trains with a first pulse energy and laser pulses or pulse trains with a second pulse energy are respectively introduced alternating into the material, for example.

In that case, the formation of the first material modification in the material is in particular not associated with the formation of cracks, whereas when the second material modification is being formed, cracks are formed in the material.

It can be advantageous if beam parameters assigned to the machining beam are selected such that, when it acts upon the material at a test position with respect to which the material is unmodified within a radius of approx. 5 μm or more than 5 μm, a material modification formed by means of the machining beam at the test position is not associated with the formation of cracks in the material, and/or a material modification formed by means of the machining beam at the test position is associated with a change in a refractive index of the material. In particular, the beam parameters assigned to the machining beam are selected such that a type I and/or a type II modification is formed when the machining beam acts upon the material at the test position.

That the material is unmodified within the aforementioned radius is to be understood to mean in particular that, in the material within the aforementioned radius, there is no material modification created by means of the machining beam and/or no material modification associated with mechanical weakening of the material.

It can be favorable if beam parameters assigned to the machining beam are selected such that, when it acts upon the material at a test position with respect to which the material is unmodified within a radius of approx. 5 μm or more than 5 μm, a material modification formed by means of the machining beam at the test position is associated with local formation of mechanical stress in the material in the region of the material modification that is formed.

The result of the aforementioned selection of the beam parameters is that, when the first and in particular the very first material modification of a specific group is being formed, cracks do not form, but rather in particular local mechanical stress is created in the material in the region of the first material modification. When the second material modification adjacent to the first material modification is being formed, in that case the existing mechanical stress is relieved, this being associated with the formation of cracks in the material in the region of the first and the second material modification. It has been shown that the cracks formed in this respect are oriented substantially parallel to a direction of the distance between the first and the second material modification, i.e. substantially parallel to the machining line in the case of a straight machining line. The result is the advantages explained at the outset.

For the technical details of the mechanism that has been explained, reference is made to the scientific publication by Bradt, R C, "The Fractography and Crack Patterns of Broken Glass", J Fail. Anal. and Preven. 11, 79-96 (2011), DOI: 10.1007/s11668-011-9432-5.

For the same reason, it can be favorable if beam parameters assigned to the machining beam are selected such that the formation of a first material modification of a specific group of material modifications is not associated with the formation of cracks in the material and that, when a second material modification of the group that is spaced apart from the first material modification is being formed, cracks are formed in the material, a distance between the first and the second material modification being at least $0.25*\lambda$ and/or at most $2.5*\lambda$. This makes it possible to optimally control an alignment of the cracks that are formed in order to align them at least approximately parallel to the machining line and/or the direction of the distance between adjacent material modifications.

The first material modification of a specific group is to be understood to mean in particular the very first material modification assigned to the group, which material modification was formed in particular as the very first material modification of the group in time.

In particular, the cracks formed during the formation of the second material modification extend at least in certain portions between the first and the second material modification and in particular in a preferred direction oriented at least approximately parallel to a direction of the distance between the first and the second material modification and/or to the machining line.

It can be favorable if beam parameters assigned to the machining beam are selected such that cracks are formed in the material when the second group of material modifications is being formed, with cracks that are formed in the material extending at least in certain portions between the first group and the second group of material modifications. This makes it possible to optimally control an alignment of the cracks that are formed in order to align them at least approximately parallel to the machining line and/or the direction of the distance between adjacent groups.

In particular, the aforementioned crack formation in the material occurs as soon as the second material modification of the second group is formed.

The material modifications introduced into transparent materials by ultrashort laser pulses are subdivided into three different classes; see K. Itoh et al. "Ultrafast Processes for Bulk Modification of Transparent Materials" MRS Bulletin, vol. 31 p. 620 (2006): Type I is a change in the isotropic refractive index; Type II is a change in the birefringent refractive index; and Type III is what is known as a void or cavity. In this respect, the material modification created depends on laser parameters of the laser beam forming the focal element, such as e.g. the pulse duration, the wavelength, the pulse energy and the repetition frequency of the laser beam, and on the material properties, such as, among other things, the electronic structure and the coefficient of thermal expansion, and also on the numerical aperture (NA) of the focusing.

The formation of type I and type II modifications is associated with a change in a refractive index of the material and, in particular, not with the formation of cracks, whereas the formation of type III modifications involves the formation of cracks in the material.

It can be advantageous if the machining beam has a focal zone and in particular an elongated focal zone, the focal zone at least in certain portions being introduced into the material of the workpiece and being moved relative to the material along the machining line. This makes it possible to modify the material of the workpiece in a region defined by the dimensions of the focal zone introduced into the material.

In particular, it can be provided that the machining beam has a quasi-nondiffractive and/or Bessel-like beam profile in the focal zone.

In particular, the focal zone should be understood to mean a focused radiation region of the machining beam that in particular has a specific spatial extent. To determine spatial dimensions of the focal zone, such as e.g. a diameter of the focal zone, only intensity values above a specific intensity threshold are considered. In this respect, the intensity threshold is selected, for example, such that values below this intensity threshold have such a low intensity that they are no longer relevant for interaction with the material for the purpose of forming material modifications. For example, the intensity threshold is 50% of a global intensity maximum of the focal zone.

In particular, the machining beam has assigned to it a respective spatial region of interaction, in which the machining beam interacts with the material of the workpiece when it is introduced into this material. In particular, the machining beam interacts with the material in this region of interaction by way of nonlinear absorption. In particular, the region of interaction is formed in the focal zone and/or by means of the focal zone of the machining beam.

In particular, the elongated focal zone extends over a thickness of the material and/or over a thickness of a segment to be separated from the material. This modifies the material for example over the entire thickness, in order to make it possible to separate the material.

In particular, the elongated focal zone extends along a longitudinal center axis, with the longitudinal center axis preferably being oriented transversely and in particular perpendicularly to an outer side of the workpiece. This outer side is in particular an outer side through which the focal zone is coupled into the material of the workpiece.

For example, the longitudinal center axis of the focal zone is oriented parallel or transversely to a thickness direction of the material.

In particular, the longitudinal center axis of the focal zone is oriented at least approximately parallel to a main propagation direction of the machining beam.

A length of the focal zone that is oriented along the longitudinal center axis may be, for example, between 50 µm and 5000 µm and preferably between 100 µm and 1000 µm.

In particular, the machining beam and/or the focal zone of the machining beam have a symmetrical transverse beam cross section.

A transverse beam diameter of the machining beam and/or of the focal zone may be between 0.2 µm and 5 µm, for example. For example, the transverse beam diameter is approx. 1 µm.

The transverse beam cross section is to be understood to mean in particular a cross section oriented perpendicularly to the main propagation direction of the machining beam and/or a cross section oriented perpendicularly to the longitudinal center axis of the focal zone. The transversal beam diameter is to be understood to mean the diameter of the machining beam or of the focal zone in this cross section.

In particular, the machining beam and/or the focal zone are formed by shaping an input laser beam and in particular a Gaussian input laser beam, the beam shaping in particular including an imposition of the phase on a transverse beam cross section of the input laser beam. For example, the beam is shaped by means of a diffractive and/or refractive and/or reflective optical element, such as e.g. an axicon element.

A relative movement of the elongated focal zone of the machining beam through the material along the machining line forms in particular a machining surface corresponding to the machining line, at which machining surface the material is modified and/or material modifications are formed.

In particular, it can be provided that the machining line is a straight line at least in certain portions and/or that the machining line is curved at least in certain portions. For example, shaped and/or rounded separating edges can be formed by means of a curved machining line.

In particular, the machining line is oriented parallel to an outer side of the workpiece.

In particular, it can be provided that the material of the workpiece can be separated or is separated along the machining line and/or along a machining surface that is assigned to the machining line and has material modifications.

The material of the workpiece is preferably separated by exerting a thermal action and/or mechanical stress and/or by etching by means of at least one wet-chemical solution. The etching may be performed in an ultrasound-assisted etching bath, for example.

In particular, the indications "at least approximately" or "approximately" are to be understood in general to mean a deviation of no more than 10%. Unless stated otherwise, the indications "at least approximately" or "approximately" are to be understood to mean in particular that an actual value and/or distance and/or angle deviates by no more than 10% from an ideal value and/or distance and/or angle.

Elements which are the same or have equivalent functions are provided with the same reference signs in all of the figures.

An exemplary embodiment of an apparatus for the laser machining of a workpiece is shown in FIG. 1 and is denoted by 100 in that figure. The apparatus 100 can be used to create localized material modifications in a material 102 of the workpiece 104, such as for example defects on the submicron scale or on the atomic scale which weaken the material. The workpiece 104 can be separated at these material modifications.

The apparatus 100 comprises a laser beam source 106 which provides an input laser beam 108. The input laser beam 108 provided by the laser beam source 106 is in particular a pulsed laser beam and/or an ultrashort pulse laser beam. For example, the input laser beam 108 provided by the laser beam source 106 has a Gaussian beam profile.

The laser beam source 106 comprises a control device 110, by means of which pulse parameters of laser pulses of the input laser beam 108 can be set. The pulse parameters are or include, for example, a pulse energy and/or a pulse duration and/or a repetition rate of the laser pulses.

In particular, the laser beam source 106 may have a pulse selection device 111 or a pulse selection device 111 can be assigned to the laser beam source 106 (indicated in FIG. 1). In particular, laser pulses can be coupled out of the laser beam source 106 at defined times and/or at defined time intervals by means of the pulse selection device 111, in order to introduce said laser pulses into the material 102 of the workpiece 104. The pulse selection device 111 is to be understood to mean in particular a "pulse picker".

In particular, the pulse selection device 111 comprises an acousto-optical modulator and/or an electro-optical modulator. In particular, the pulse selection device 111 is in the form of an acousto-optical or electro-optical modulator.

The apparatus 100 further comprises a beam shaping device 112 for forming a machining beam 114 and focusing it into the material 102 of the workpiece 104.

The beam shaping device 112 preferably comprises a beam shaping element 116 for forming a beam 118 with a quasi-nondiffractive and/or Bessel-like beam profile.

In the exemplary embodiment shown, the Gaussian input laser beam 108 is coupled into the beam shaping element 116 and the beam 118 is formed with a quasi-nondiffractive beam profile by shaping the input laser beam 108 using the beam shaping element 116.

The beam is shaped by means of the beam shaping element 116 by imposition of the phase on a transverse beam cross section of the input laser beam 108, the imposition of the phase being selected in such a way that the beam 118 is formed as a quasi-nondiffractive and/or Bessel-like beam.

It can be advantageous if the beam shaping element 116 has at least one diffractive optical element or is in the form of a diffractive optical element. In principle, it is also possible for the beam shaping element 116 to be configured as or to comprise a refractive and/or reflective optical element.

For example, the beam shaping element 116 is or comprises an axicon element and/or a spatial light modulator (SLM).

With regard to the definition and the implementation of quasi-nondiffractive and/or Bessel-like beams and the technical configuration of the beam-shaping element 116, reference is made to the book "Structured Light Fields: Applications in Optical Trapping, Manipulation and Organisation", M. Wördemann, Springer Science & Business Media (2012), ISBN 978-3-642-29322-1 and also to the scientific publications "Bessel-like optical beams with arbitrary trajectories" by I Chremmos et al., Optics Letters, Vol. 37, No. 23, 1 Dec. 2012 and "Generalized axicon-based generation of nondiffracting beams" by K. Chen et al., arXiv:1911.03103v1 [physics.optics], 8 Nov. 2019.

To focus and/or project the beam 118 into the material 102 of the workpiece 104, the apparatus 100 has a telescope device 120, which is preferably arranged behind the beam shaping element 116 and/or the beam 118 with respect to a main propagation direction 122. In the example shown, the quasi-nondiffractive beam 118 is focused and/or projected into the material 102 by means of the telescope device 120.

The main propagation direction 122 is a main propagation direction of the input laser beam 108 and/or of beams that are formed from the input laser beam 108 and/or of beams 123 that are guided through the beam shaping device and/or of the machining beam 114. In particular, the main propagation direction is to be understood to mean a main dispersion direction and/or longitudinal direction of the aforementioned beams. A transverse direction is to be understood to mean in particular a direction perpendicular to the main propagation direction 122.

The beam focused and/or coupled out of the beam shaping device 112 or the telescope device 120 is referred to in the present case as machining beam 114. As is indicated in FIG. 1, for example, this machining beam 114 acts upon the material 102 of the workpiece 104, i.e. the machining beam 114 is introduced into the material 102.

In the embodiment shown in FIG. 1, the telescope device 120 comprises a first lens element 124 and a second lens element 126 spaced apart from the first lens element 124 in the main propagation direction 122.

The first lens element 124 is a long focal length lens element and/or input lens element of the telescope device 120. The second lens element 126 is an output lens element and/or short focal length lens element of the telescope device 120. In particular, the second lens element is in the form of an objective or has the functionality of an objective.

The beam shaping element 116 and/or first lens element 124 and/or the second lens element 126 are not necessarily formed in one piece. In particular, it can be provided that the beam shaping element 116 and/or the first lens element 124 and/or the second lens element 126 in each case is formed from multiple optical components or comprises multiple optical components.

A first focal length $f_1$ of the first lens element 124 is greater than a second focal length $f_2$ of the second lens element 126. In particular, a ratio $f_1/f_2$ is at least 5 and/or at most 50.

In principle, it is also possible for the first lens element 124 and/or a functionality of the first lens element 124 to be integrated in the beam shaping element 116.

In particular, the main propagation direction 122 is oriented parallel to an optical axis 128 of the telescope device 120 and/or of the beam shaping device 112.

Due to the beam shaping performed by means of the beam shaping element 116, the machining beam 114 formed for the purpose of laser machining of the material 102 of the workpiece 104 has a quasi-nondiffractive and/or Bessel-like beam profile, i.e. the machining beam 114 has an elongated focal zone 130. The focal zone 130 extends along a longitudinal center axis 132, which is oriented in particular parallel to the main propagation direction 122 and/or parallel to the optical axis 128.

In the example shown, the longitudinal center axis 132 is a straight line. In principle, it is also possible for the longitudinal center axis 132 of the focal zone 130 at least in certain portions to be in the form of a curve and/or to have a curved shape.

With regard to the formation and properties of quasi-nondiffractive and/or Bessel-like beams with curved shapes, reference is made to the scientific publication "Bessel-like optical beams with arbitrary trajectories" by I. Chremmos et al., Optics Letters, Vol. 37, no. 23, 1 Dec. 2012.

Furthermore, with regard to the focal zone 130, reference is made to WO 2016/079062 A1. The technical implementation and the properties of the focal zone 130 are described in detail in that document.

In particular, the telescope device 120 can be used to adapt spatial dimensions of the focal zone 130 for the purpose of machining the material 102 of the workpiece 104, it being possible in particular to adapt a length of the focal zone 130 parallel to the main propagation direction 122 and/or optical axis 128. Furthermore, for example, a transverse diameter of the machining beam 114 in the focal zone 130 can be adapted.

In particular, the focal zone 130 is to be understood to mean a focused region and/or spatially continuous region within which a laser radiation intensity is at least large enough that when the focal zone 130 is applied to the material 102 of the workpiece 104, material modifications are created within the material 102, it being possible in particular to separate the material 102 at these material modifications.

The beam parameters of the machining beam 114 are selected such that, when the machining beam 114 acts upon the material 102 in the focal zone 130, the material 102 nonlinearly absorbs the laser radiation focused there. Material modifications in the material 102 can be formed by virtue of this interaction in the form of nonlinear absorption.

In particular, the intensity of the laser radiation in the focal zone 130 provided for the laser machining of the material 102 is at least approximately constant along the longitudinal center axis 132.

However, it is in principle also possible for the intensity to vary along the longitudinal center axis 132 and/or to be zero at isolated points. In that case, the focal zone 130 is subdivided, for example, into a plurality of partial focal zones, which extend along a common longitudinal center axis. In this respect, the term "focal zone" can also include a focal zone composed of multiple partial focal zones, provided that these partial focal zones are used to form material modifications in the direction of the longitudinal center axis which allow the material 102 to be separated and/or which weaken the material 102 in such a way that separation of the material is made possible.

In the example shown, the longitudinal center axis 132 is a straight line. However, it is in principle also possible for the focal zone 130 to extend along a longitudinal center axis with a curved shape. For example, the imposition of the phase on the input laser beam 108 that is performed by the beam shaping element 116 can take place in such a way that the focal zone 130 is implemented with a curved shape.

The focal zone 130 preferably has an at least approximately symmetrical intensity distribution in a cross section oriented perpendicularly to the longitudinal center axis 132. For example, the intensity distribution in the cross section oriented perpendicularly to the longitudinal center axis 132 is at least approximately radially symmetrical with respect to the longitudinal center axis 132.

The input laser beam 108 and/or the machining beam 114 have a wavelength $\lambda$, the material 102 being transparent to this wavelength. For example, the material 102 is or comprises a glass material.

The workpiece 104 is mounted in such a way that it can be moved relative to the machining beam 114. For the laser machining of the workpiece 104, it is provided that the material 102 is moved along a machining line 134 relative to the machining beam 114. For example, for this purpose the apparatus 100 comprises a movable holding device (not shown) for the workpiece 104, by means of which a corresponding relative movement with respect to the machining beam 114 can be realized.

For example, the holding device may be actuatable by means of the control device 110 in order to move the machining beam 114 along the predetermined machining line 134, and in particular to couple laser pulses into the material 102 at specific spatial positions on the machining line 134 by means of the machining beam 114.

The material 102 has a first outer side 136 and a second outer side 138 spaced apart from the first outer side 136, the first outer side 136 and the second outer side 138 being spaced apart parallel to a thickness direction 140 of the material 102, for example. For example, the material 102 has an at least approximately constant thickness with respect to the thickness direction 140. For example, the workpiece 104 is plate-shaped and/or panel-shaped.

The material 102 of the workpiece 104 intended for laser machining may, for example, have a thickness of between 50 µm and 5000 µm and preferably between 100 µm and 1000 µm.

A method for the laser machining of the workpiece 104 by means of the device 100 is carried out as follows:

For the laser machining of the workpiece 104, the machining beam 114 acts upon the workpiece material 102, i.e. the focal zone 130 assigned to the machining beam 114 is introduced into the material 102. The machining beam 114 is moved relative to the material 102 along the predetermined machining line 134 along which laser machining and/or modification of the material 102 is to take place. An advancement direction 141, in which the machining beam 114 is moved relative to the material 102, at a respective position of the machining line 134 is always oriented parallel and/or tangentially to the machining line 134.

The machining beam 114 is coupled into the material 102 for example through the first outer side 136, the longitudinal center axis 132 preferably being oriented transversely and in particular perpendicularly to the first outer side 136. In principle, it is possible to couple the machining beam 114 into the material 102 in such a way that the longitudinal center axis 132 is oriented at a specific angle of contact relative to the first outer side 136. In particular, the orientation and/or the angle of contact of the longitudinal center axis 132 with respect to the first outer side 136 is constant for the purpose of forming all material modifications 142 along the machining line 134.

The machining beam 114 and/or the focal zone 130 preferably extend over the entire thickness of the material 102 or of a segment to be separated from the material 102 and in particular without interruption over the entire thickness of the material 102 or of the segment to be separated, respectively. A length of the machining beam 114 and/or of the focal zone 130 that is oriented in the direction of the longitudinal center axis 132 is selected in particular such that it is at least as great as the thickness of the material 102 or of the segment to be separated.

Material modifications 142, which are positioned respectively spaced apart from one another along the machining line 134 in the material 102, are formed by means of the machining beam 114 configured as a pulsed laser beam and/or ultrashort pulse laser beam, for example.

In particular, a respective single pulse or pulse train is introduced into the material 102 by means of the machining beam 114 in order to form a specific material modification 142.

A local position of the material modification 142 formed in the material 102 corresponds to that local position at which the machining beam 114 acts on the material, and/or to that local position at which the single pulse or pulse train, respectively, was introduced into the material 102 by means of the machining beam 114.

Figure 2:
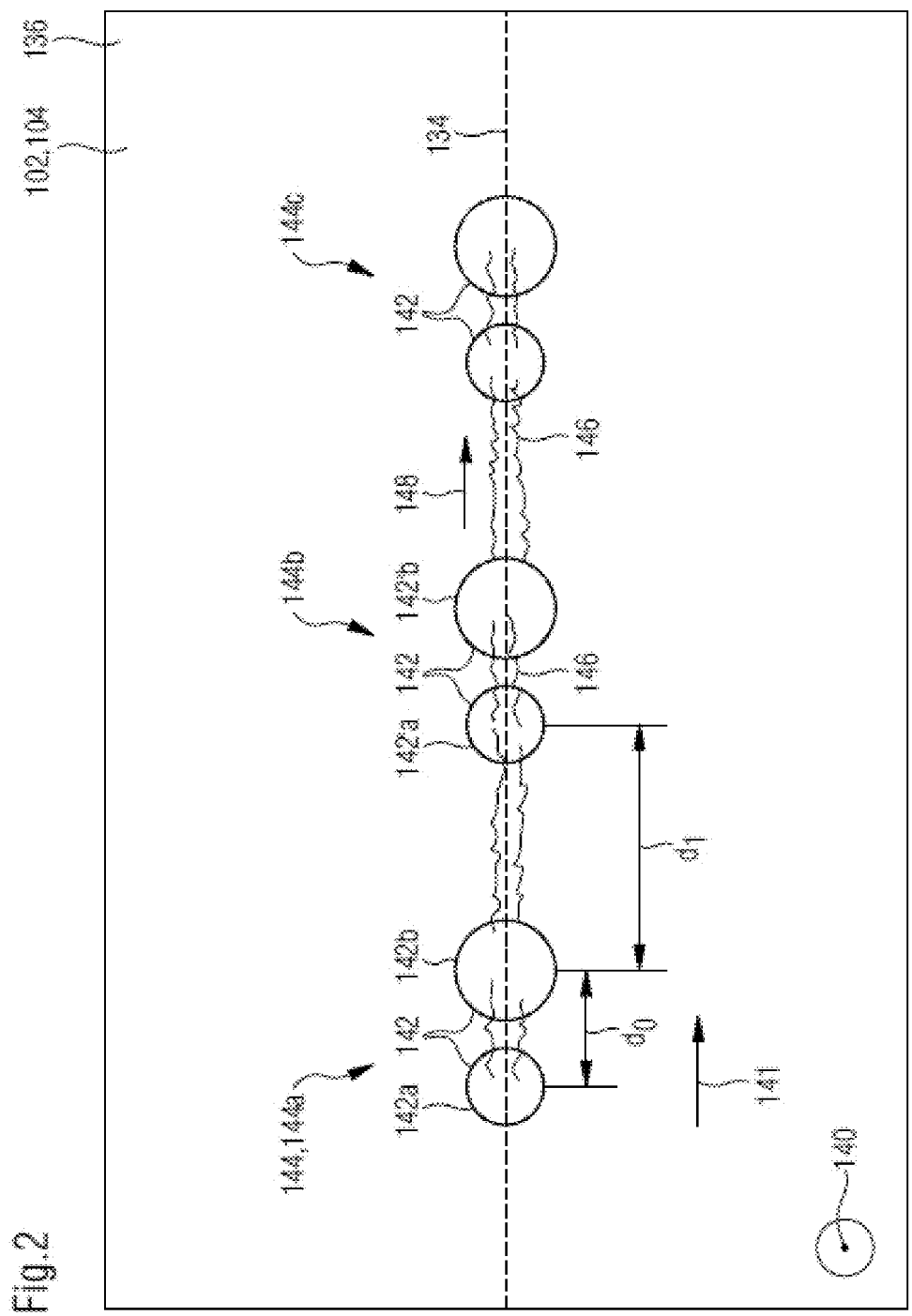
FIG. 2 shows an example of a material of a workpiece with material modifications formed thereon, showing a view of an outer side of the workpiece and with the material modifications being arranged along a straight machining line, according to some embodiments.

In the example shown in FIG. 2, the material modifications 142 formed are indicated as circles in a view from above of the first outer side 136 of the material 102. On account of the elongated focal zone 130 assigned to the machining beam 114 and introduced into the material 102, a respective material modification 142 extends parallel to the longitudinal center axis 132 of the focal zone 130, which in the example shown is oriented parallel to the thickness direction 140, through the material 102 (and is formed not just on the surface on the first outer side 136 of the material 102). In particular, the material 102 is modified at a specific material modification 142 parallel to the thickness direction 140 and/or to the longitudinal center axis 132 of the introduced focal zone 130, the modified region being defined by the spatial dimensions of the focal zone 130.

A specific material modification 142 is therefore to be understood to mean a modified region of the material 102 which is defined by the spatial dimensions of the focal zone 130 introduced into the material 102 and which in particular extends at least by components in the thickness direction 140 of the material 102.

By virtue of the elongated focal zone 130 of the machining beam 114 that has been introduced into the material 102, the relative movement of the machining beam along the machining line 134 forms a machining surface assigned to the machining line 134, over the surface area of which material modifications 142 are arranged and at which the material 102 can in particular be separated. In the example according to FIG. 2, the machining surface is a plane that is parallel to the thickness direction 140 and runs through the machining line 134.

It is provided that, by means of the machining beam 114, along the machining line 134 first of all a first material modification 142a is formed and then a second material modification 142b, the second material modification 142b being spaced apart from the first material modification 142a along the machining line 134 by a distance do.

The first material modification 142a and the second material modification 142b form a first group 144a of material modifications or are assigned to a first group 144a of material modifications.

A second group 144b of material modifications is also formed, this second group 144b likewise having a first material modification 142'a and a second material modification 142'b. In particular, it can be provided that at least one further group 144c of material modifications is formed, which likewise has two material modifications 142, for example.

In principle, a group 144 of material modifications may have two or more material modifications 142.

Different groups 144 are respectively spaced apart from one another along the machining line 134 by a distance $d_1$, the distance $d_1$ being understood to mean the shortest distance between the material modifications 142 of the different groups 144, i.e. a distance between the respective closest material modifications 142 of the different groups 144. In the example shown in FIG. 2, the distance $d_1$ between the first group 144a and the second group 144b is to be understood to mean the distance between the second material modification 142b and the first material modification 142'a.

The distances $d_0$, $d_1$ are to be understood to mean in particular distances based on the respective geometric center points of the corresponding material modifications 142, as indicated in FIG. 2, for example.

The distance $d_0$ between adjacent material modifications 142 within a specific group 144 is approx. 1.0 µm, for example. For example, do is at least 0.25 µm and in particular at least 0.5 µm and in particular at least 0.75 µm and in particular at least 0.85 µm. For example, do is at most 2.5 µm and in particular at most 2.0 µm and in particular at most 1.5 µm and in particular at most 1.25 µm.

Mutually adjacent material modifications 142 or groups 144 are to be understood to mean respectively closest adjacent material modifications 142 or groups 144 between which, in particular, no further material modifications 142 or groups 144 are arranged.

The distance $d_1$ between the closest material modifications 142 of two adjacent groups 144 is approx. 15 µm, for example. For example, $d_1$ is at least 5 µm and in particular at least 7.5 µm and in particular at least 10 µm. For example, $d_1$ is at most 40 µm and in particular at most 30 µm and in particular at most 20 µm.

The machining beam 114 has, for example, at least one of the following beam parameters: Wavelength λ=approx. 1030 nm; Pulse duration of a single pulse for forming a specific material modification 142: 0.3 ps to 20 ps; Pulse energy of a single pulse or pulse train for forming a specific material modification 142: 50 µJ to 500 µJ.

The transverse diameter of the machining beam 114 in the focal zone 130 is approx. 1 µm, for example.

An advancement velocity oriented parallel to the advancement direction 141 is approx. 200 mm/s, for example.

A repetition rate of laser pulses of the machining beam 114 is approx. 200 kHz, for example. At this repetition rate and the advancement velocity of approx. 200 mm/s, mutually adjacent material modifications 142 are formed, for example, at a time interval of approx. 5 µs, i.e. a laser pulse for forming the second material modification 142b is introduced into the material 102 for example approx. 5 µs later than a laser pulse for forming the first material modification 142a.

The beam parameters of the machining beam 114 are selected in particular such that cracks do not form in the material 102 when the respective first material modification 142a, 142'a of a specific group 144a and 144b, respectively, is being formed, but rather only when the respective second material modification 142b, 142'b of the corresponding group 144a and 144b, respectively, is being formed.

In the example shown in FIG. 2, first of all the first material modification 142a is formed and then the second material modification 142b of the first group 144a, with cracks 146 being formed during the formation of the second material modification 142b. These cracks 146 extend in the region of the first and second material modifications 142a, 142b and have a preferred direction 148 and/or main direction of extent which is oriented at least approximately parallel to a direction of the distance $d_0$ between these adjacent material modifications 142a, 142b. For example, the cracks 146 extend in a spatial region of approx. 3 μm to 5 μm around these material modifications 142a, 142b.

Then, the first and second material modifications 142'a, 142'b assigned to the second group 144b are formed one after the other, with cracks 146 being formed in the region around these material modifications 142'a, 142'b during the formation of the second material modification 142'b (in a similar way to the first group 144a).

In this way, cracks 146 are formed between the respective material modifications 142 of a specific group 144 and also between the material modifications 142 of different groups 144. In particular, the formation of the material modifications 142 may cause the cracks 146 between different groups 144 to join and/or overlap along the machining line 134.

The preferred direction 148 of the cracks 146 that are formed is oriented at least approximately parallel to a direction of the distance $d_0$ between adjacent material modifications 142 and/or the distance $d_1$ between adjacent groups 144 (indicated in FIG. 2). In particular, the preferred direction 148 is oriented parallel to the machining line 134.

In particular, it is provided that the different material modifications 142 of a specific group 144 are formed with the same beam parameters of the machining beam 114. However, it is in principle also possible for mutually adjacent material modifications 142 to be formed with different beam parameters.

For example, it can be provided that the machining beam 114 has a higher energy and/or pulse energy for the purpose of forming the respective second material modifications 142b, 142'b than for the purpose of forming the respective first material modifications 142a, 142'a. For example, the pulse energy assigned to the machining beam 114 for the purpose of forming the first material modifications 142a, 142'a is approx. 60% of the pulse energy for the purpose of forming the second material modifications 142b, 142'b (indicated by circles of different sizes in FIG. 2).

After the material modifications 142 and the associated cracks 146 have been formed, the material 102 can be separated along the machining line 134, it being possible to separate the material 102 by exerting a mechanical force, for example.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

λ Wavelength
$d_0$ Distance
$d_1$ Distance
100 Apparatus
102 Material
104 Workpiece
106 Laser beam source
108 Input laser beam
110 Control device
111 Pulse selection device
112 Beam shaping device
114 Machining beam
116 Beam shaping element
118 Beam
120 Telescope device
122 Main propagation direction
123 Beams
124 First lens element
126 Second lens element
128 Optical axis
130 Focal zone
132 Longitudinal center axis
134 Machining line
136 First outer side
138 Second outer side
140 Thickness direction
141 Advancement direction
142 Material modification
142a First material modification
142'a First material modification
142b Second material modification
142'b Second material modification
144 Group
144a First group
144b Second group
144c Further group
146 Cracks
148 Preferred direction

The invention claimed is:

1. A method for the laser machining of a workpiece by means of a machining beam, the workpiece having a material that is transparent to a wavelength λ of the machining beam, in which method material modifications are formed in the material along a predetermined machining line by action of the machining beam upon the material, a first group of spaced-apart material modifications is formed in the material, with mutually adjacent material modifications of the first group being formed one after the other in time and having a distance $d_0$ from one another of at least $0.25*\lambda$ and/or at most $2.5*\lambda$, and in which method a second group of spaced-apart material modifications is formed in the material, with mutually adjacent material modifications of the second group being formed one after the other in time and having a distance do from one another of at least $0.25*\lambda$ and/or at most $2.5*\lambda$, and the shortest distance $d_1$ between the material modifications of the first group and the material modifications of the second group being at least 5 µm.

2. The method as claimed in claim 1, wherein the machining beam is a pulsed laser beam, and wherein a respective laser pulse or pulse train composed of multiple laser pulses is introduced into the material by means of the machining beam in order to form a specific material modification.

3. The method as claimed in claim 2, wherein at least one further group of spaced-apart material modifications is formed, with mutually adjacent material modifications of the at least one further group being formed one after the other in time and having a distance $d_0$ from one another of at least $0.25*\lambda$ and/or at most $2.5*\lambda$, and the shortest distance $d_1$ between the material modifications of the at least one further group and material modifications of a group of material modifications that is adjacent and closest to the at least one further group being at least 5 µm.

4. The method as claimed in claim 3, wherein the distance $d_0$ between the adjacent material modifications assigned to a specific group in each case is at least $0.5*\lambda$ and/or at most $2.0*\lambda$.

5. The method as claimed in claim 2, wherein the distance $d_0$ between the adjacent material modifications assigned to a specific group in each case is at least $0.5*\lambda$ and/or at most $2.0*\lambda$.

6. The method as claimed in claim 2, wherein the wavelength $\lambda$ of the machining beam is at least 300 nm and/or at most 1500 nm.

7. The method as claimed in claim 1, wherein at least one further group of spaced-apart material modifications is formed, with mutually adjacent material modifications of the at least one further group being formed one after the other in time and having a distance $d_0$ from one another of at least $0.25*\lambda$ and/or at most $2.5*\lambda$, and the shortest distance $d_1$ between the material modifications of the at least one further group and material modifications of a group of material modifications that is adjacent and closest to the at least one further group being at least 5 µm.

8. The method as claimed in claim 1, wherein the distance $d_0$ between the adjacent material modifications assigned to a specific group in each case is at least $0.5*\lambda$ and/or at most $2.0*\lambda$.

9. The method as claimed in claim 7, wherein the distance $d_0$ between the adjacent material modifications assigned to a specific group in each case is at least $0.5*\lambda$ and/or at most $2.0*\lambda$.

10. The method as claimed in claim 1, wherein the wavelength $\lambda$ of the machining beam is at least 300 nm and/or at most 1500 nm.

11. The method as claimed in claim 1, wherein the mutually adjacent material modifications assigned to a specific group are formed at a time interval of at least 1 µs and/or at most 15 µs.

12. The method as claimed in claim 1, wherein the shortest distance $d_1$ between the material modifications of adjacent closest groups of material modifications is at least 7 µm and/or at most 40 µm.

13. The method as claimed in claim 1, wherein the machining beam is moved relative to the material along the machining line at an advancement velocity, the advancement velocity being at least 50 mm/s and/or at most 400 mm/s.

14. The method as claimed in claim 1, wherein the material modifications are formed one after another in time along the machining line by means of the machining beam.

15. The method as claimed in claim 1, wherein the machining beam has same beam parameters for forming the material modifications assigned to a specific group.

16. The method as claimed in claim 1, wherein beam parameters assigned to the machining beam are selected such that, when it acts upon the material at a test position with respect to which the material is unmodified within a radius of more than 5 µm, a material modification formed by means of the machining beam at the test position is not associated with the formation of cracks in the material, and/or a material modification formed by means of the machining beam at the test position is associated with a change in a refractive index of the material.

17. The method as claimed in claim 1, wherein beam parameters assigned to the machining beam are selected such that the formation of a first material modification of a specific group of material modifications is not associated with the formation of cracks in the material and wherein, during the formation of a second material modification of the group that is spaced apart from the first material modification, cracks are formed in the material, a distance between the first and the second material modification being at least $0.25*\lambda$ and/or at most $2.5*\lambda$.

18. The method as claimed in claim 1, wherein beam parameters assigned to the machining beam are selected such that cracks are formed in the material during the formation of the second group of material modifications, with cracks that are formed in the material extending at least in certain portions between the first group and the second group of material modifications.

19. The method as claimed in claim 1, wherein the machining beam has a focal zone, the focal zone at least in certain portions being introduced into the material of the workpiece and being moved relative to the material along the machining line.

20. The method as claimed in claim 1, wherein the material of the workpiece is capable of being separated along the machining line and/or along a machining surface that is assigned to the machining line and has material modifications.

* * * * *